Feb. 12, 1952     P. D. STRUM     2,585,353
APPARATUS FOR TESTING CRYSTAL RECTIFIERS
Filed May 25, 1950     3 Sheets-Sheet 1

INVENTOR
Peter D. Strum

Feb. 12, 1952 P. D. STRUM 2,585,353
APPARATUS FOR TESTING CRYSTAL RECTIFIERS
Filed May 25, 1950 3 Sheets-Sheet 2

INVENTOR

*Peter D. Strum*

Feb. 12, 1952 P. D. STRUM 2,585,353
APPARATUS FOR TESTING CRYSTAL RECTIFIERS
Filed May 25, 1950 3 Sheets-Sheet 3
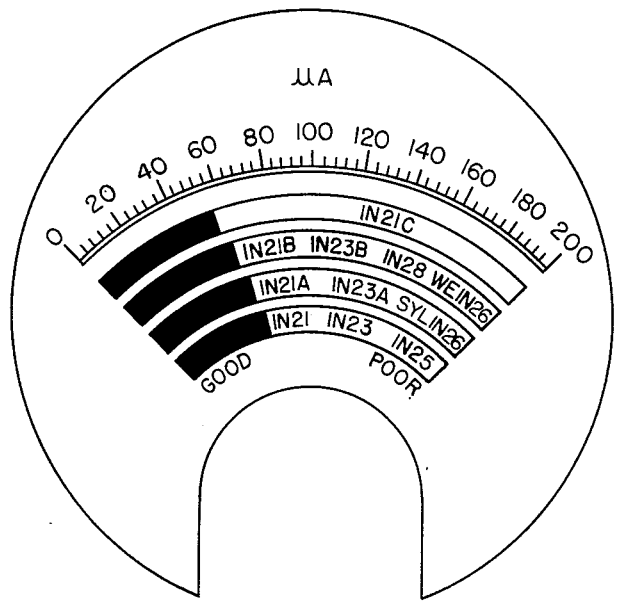
Fig. 6
Fig. 7
INVENTOR
Peter D. Strum Patented Feb. 12, 1952

2,585,353

UNITED STATES PATENT OFFICE 2,585,353

APPARATUS FOR TESTING CRYSTAL RECTIFIERS

Peter D. Strum, Levittown, N. Y., assignor to Airborne Instruments Laboratory, Incorporated, Mineola, N. Y.

Application May 25, 1950, Serial No. 164,206

7 Claims. (Cl. 175—183)

The present invention relates to apparatus and methods for testing of crystal rectifiers and, more particularly to the D. C. testing of crystal rectifiers.

The manufacture of crystal rectifiers requires extensive testing in order to reject unsatisfactory units. This testing equipment normally consists of signal generators, amplifiers, and indicating equipment which determine the conversion loss and noise temperature of crystal rectifiers. For use in the testing of radar sets, television service shops, military use, and other field applications, such laboratory type test equipment is not practical as it is too expensive to be widely duplicated. Further it is cumbersome and so complex in its operation as to require a high degree of skill to properly perform the tests.

Portable test devices in use, prior to the present invention, consisted of ohmmeter circuits which measured the back and front resistance of crystal rectifier and ammeter circuits to measure the back current flow with a fixed potential applied across the crystal. Values thus obtained were compared to those obtained from standard test crystals, and if within limits, were generally considered satisfactory. However, when placed in actual use, many of these crystals were found to be defective. One reason for this is that in actual practice and particularly in certain applications such as mixers for frequency conversion, other characteristics of importance are conversion loss and noise temperature, both of which are not detected by mere measuring of backward and forward resistance. Use was made of this prior testing method because it is a simple test that could be performed in the field. A burned-out crystal, or a crystal in which the contact point had moved due to shock, would usually show a variation in its back and front resistance. However, crystals which have passed a noise temperature and conversion loss test during manufacturing could be damaged in such a manner as to pass the backward and forward resistance test and still fail to pass the conversion loss test. The tester herein disclosed yields accurate indications of conversion loss and thus is a practical instrument for crystal testing. In one experimental model indications of conversion loss were found to have a mean error of only 0.3 db as verified by standard test procedures.

Although the tester was designed to give indications of conversion loss, it was found that the experimental model yielded indications of noise temperature with a mean error of only 0.3 unit of noise temperature as verified by standard test procedures. Tests made on type 1N21B crystals showed that the tester permitted evaluating the noise figure of a receiver utilizing a crystal mixer and an I.-F. amplifier having a 5 db noise figure with a mean error of only 0.4 db as verified by standard test procedures.

The results of these tests indicate that the method of testing crystals utilizing the D.-C. checker of this invention permits a fairly accurate acceptance or rejection of crystals with regard to their conversion loss, noise temperature, and noise figure.

Accordingly, it is a major object of this invention to provide a novel apparatus and method for testing crystal rectifiers. Further, it is the intention to provide a means to determine the conversion loss characteristics of a crystal rectifier. It is a further object to provide an inexpensive testing device for crystal rectifiers. It is still another object to provide a lightweight portable test unit for crystal rectifiers. Still another object of this invention is to provide a device capable of readily evaluating the suitability of crystal rectifiers for use as mixers. It is still another object to provide an apparatus and method for testing crystal rectifiers by applying direct potentials.

The operation of this invention will be described with reference to accompanying drawings wherein.

Figure 3:
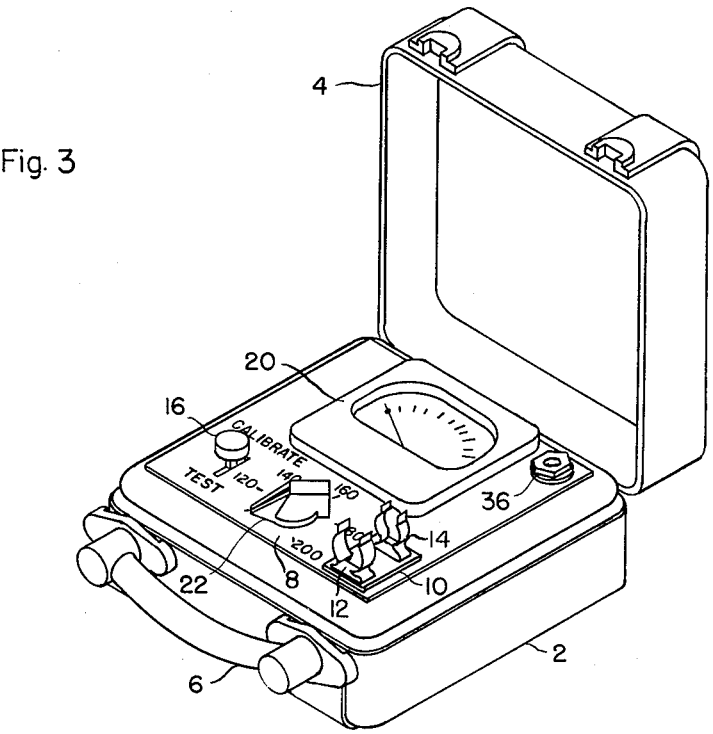

Figure 3 discloses an isometric view of one embodiment in a portable case with the case cover open.

Figure 4:
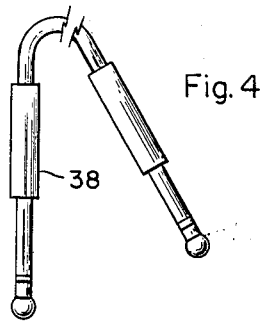

Figure 4 shows one form of an extension cable for use with the tester.

Figure 5:
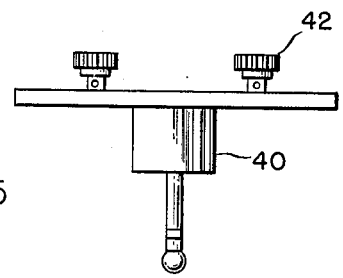

Figure 5 shows in elevation an adapter which will accommodate other types of crystals for testing by the device shown in Figure 3.

Figure 6 shows an enlarged plan view of the meter scale of the apparatus shown in Figure 3.

Figure 7 shows a graph of the relationship between meter reading and crystal conversion loss.

Figure 1:
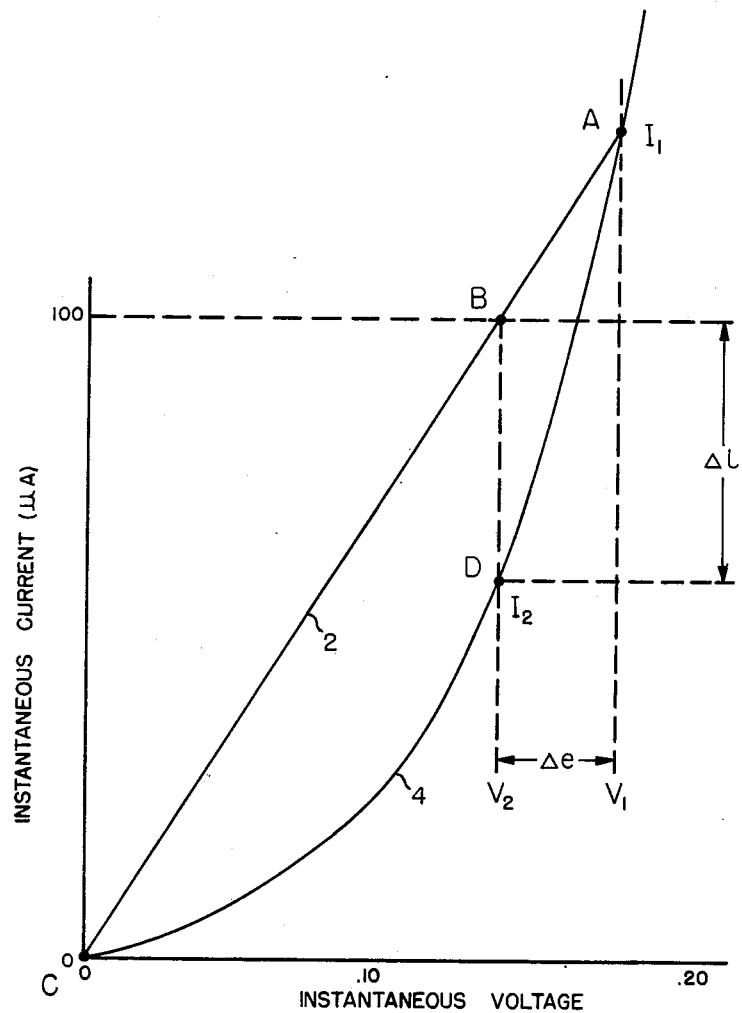
Figure 1 represents the E-I curve of the typical crystal rectifier showing current flow in the forward direction with change in the applied potential.

The tester measures the degree of non-linearity of the forward portion of the E-I curve. This curve for a typical mixer type crystal rectifier, such as a type 1N21B, is shown in Figure 1. It has been found that conversion loss is related to the non-linearity of this E-I curve. In particular it has been found that the conversion loss of a crystal is dependent only on the value of $\bar{x}$ under conditions of operation, $\bar{x}$ being defined as the time average of the instantaneous values of $x$ for normal local oscillator excitation where $x$ is the slope $$\frac{d\ (\log i)}{d\ (\log e)}$$

of the forward portion of the logarithmic E-I curve.

The forward portion of the E-I curve follows the mathematical expression $$i = ke^x$$

the large-signal conductance $$G = \frac{i}{e} = Ke^{x-1}$$

and the small-signal conductance $$g = \frac{di}{de} = Kxe^{x-1}$$

then $$g - G = Ke^{x-1}(x-1)$$

and therefore $$g - G = (x-1)(G)$$

Experimentally it has been verified that at a current 100 microamperes, for crystals of the 1N21B type, $(x-1)G$ is approximately proportional to $\bar{x}$.

The quantities $g$ and $G$ may be determined by D-C measurements and accordingly the tester has been designed to yield an indication of current which is proportional to $g-G$. An incremental change in direct voltage is used to measure $g$ approximately, and an initial adjustment is made to indicate G and simultaneously subtract it from $g$, thus obtaining an indication of conversion loss.

With further reference to Figure 1, line 2 represents the E-I curve of a linear element, the curve 4 represents the E-I curve of a typical crystal.

In this embodiment of the invention the voltage increment $\Delta e = V_1 - V_2$ is maintained constant. Provision is made for $V_1$ to be adjusted to a value such that when a negative voltage increment, minus $\Delta e$ is added, the current at point B for a linear element will be 100 microamperes. This type of adjustment establishes a relation between $I_1$ and $G$; therefore, the calibration of the network for adjusting $V_1$ could be made so as to indicate G directly. For a non-linear element point D on the E-I curve will represent a curve differing from 100 microamperes by $\Delta i$.

The slope of the E-I curve at point A is exactly $g$. However, the slope of $g$ defined by points A and B is a reasonably good approximation; therefore, the approximate expression for small-signal conductance is $$g = \frac{I_1 - I_2}{\Delta e}$$

G is the slope of the line defined by points A and C. Since mathematically $$G = \frac{I_1}{V_1}$$

and $$G = \frac{I_1 - (I_2 + \Delta i)}{\Delta e}$$

then accordingly $$g - G = \frac{\Delta i}{\Delta e}$$

Since $\Delta e$ is a constant and $(g-G)$ is proportional to $\bar{x}$, it is seen that $\Delta i$ is proportional to $\bar{x}$. Since the current at point B would be 100 microamperes for a linear element, it is seen that $I_2$ is a direct indication of $\Delta i$. The current $I_2$ may, therefore, be interpreted by a meter calibrated directly in $\bar{x}$ or available conversion loss.

Figure 3 shows the tester installed in a case 2 which is equipped with a cover 4 and carrying handle 6.

Figure 2:
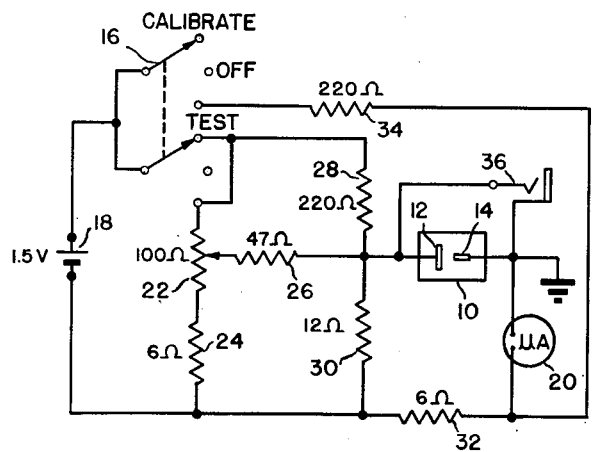
Figure 2 represents a circuit diagram of one embodiment of this invention.

The operation of a preferred embodiment of this invention may be readily understood by reference to Figure 2. The crystal to be tested is placed in holder 10 which is equipped with electrically conducting contacting members, 12 and 14. Switch 16 is placed in the Calibrate position completing an electric circuit comprising a battery 18, a series-parallel network of resistances including potentiometer 22, resistors 24, 26, 28, 30, and 32, a microammeter 20 and the crystal under test in holder 10.

Scale 8 of potentiometer 22 is calibrated by placing a linear resistance in the crystal rectifier holder 10 and then with switch 16 in Test position varying the current through microammeter 20 by means of potentiometer 22 so that the meter reads exactly 100 microamperes. The value of 100 microamperes having been experimentally determined as the optimum value for type 1N21B crystals. Switch 16 is now placed in the Calibrate position and the meter reading noted. The dial is then marked with this particular reading opposite the pointer attached to potentiometer 22. By substituting a number of resistances having values ranging between 300 and 3000 ohms, a number of points on scale 8 of potentiometer 22 may be calibrated.

In actual operation, with switch 16 in Calibrate position, the potentiometer 22 is adjusted so that the reading on scale 8 exactly corresponds with that of the meter.

Switch 16 is now placed in test position. This changes the voltages applied to the crystal by an amount minus $\Delta e$. If the crystal were a linear element the meter reading would be 100 microamperes. Since it is not a linear element the introduction of this negative increment of potential results in a change of current differing from 100 microamperes by an amount $\Delta i$. The reading on the scale is therefore an indication of crystal quality in accordance with the theory of operation previously discussed.

Resistors 24 and 26 are utilized as a means of expanding the useful range of the potentiometer 22 scale 8 making it possible to obtain a fairly linear scale with a standard tapered resistance potentiometer 22. It is obvious that a potentiometer having a specially designed resistance gradient could be utilized for this application and eliminate resistors 24, 26, and 28.

In Calibrate position potentiometer 22 and resistors 24, 26 28 and 30 from a voltage divider network which supplies a predetermined voltage to the crystal which may be adjusted by varying potentiometer 22. In Test position resistors 32 and 34 are connected in series across the source of potential. The voltage developed across resistor 32 is applied to the crystal under test as the increment of voltage, minus $\Delta e$, previously referred to.

Figure 6 is an enlarged view of the meter scale of one embodiment of the invention utilized to test various crystals of the silicon type. The scale was calibrated through the use of a large number of crystals graded by the standard test procedures. Similarly other scales may be prepared for other general types of crystals such as germanium types.

Figure 7 shows a conversion-loss calibration chart which may be used in conjunction with the test device. The calibration curve is accurate for types 1N21, 1N21A, 1N21B and 1N23B crystals. For 1N23A, 1N26, and other types of silicon crystals, the calibration chart yields correct relative values but actual operating conversion loss will be greater at rated frequencies. Regardless of type, the crystals giving the lowest meter indication will exhibit the lowest conversion loss.

As a further convenience, a jack 36 is provided in parallel with crystal holder 10 to permit employment of an extension cord 38 (Figure 4) which may be plugged into said jack 36. This permits crystals in mixer assemblies and their equipment to be tested without removal by connecting the extension cord with a proper terminating connector to said unit. In Figure 5 there is shown one embodiment of an auxiliary adapter 40 which may be plugged into jack 30 so that the unit may accommodate crystals having pigtail leads or other terminals by means of binding posts 42.

The terms forward resistance and forward direction as used are intended to mean the direction of greatest conductance.

While I have shown and described a particular embodiment of my invention, it will be apparent to those skilled in the art that changes and modifications may be made without departing from the features of my invention, and I therefore aim in the appended claims to cover all such changes and modifications as fall within the true spirit and scope of my invention.

What I claim as new and desire to secure by Letters Patent of the United States is:

1. In a testing device for a crystal rectifier, a source of direct voltage, a variable voltage dividing circuit arranged to apply a direct voltage from said source to said crystal rectifier, a circuit adapted to apply a fixed increment of direct voltage to said crystal rectifier, and a metering system adapted to measure the direct current flowing through said crystal rectifier.

2. A testing device for a crystal rectifier comprising a first source of direct voltage having a point of a first potential level and a point of a second potential level, a potentiometer, one terminal of said potentiometer being connected to the said point of first potential level and the other to said point of a second potential level, a variable tap on said potentiometer being connected to one terminal of a crystal holder, a second terminal of said crystal holder being connected in series with a direct current measuring device and said point of a first potential level, a second source of direct voltage connected to said first and second terminals of said crystal holder and a means to interrupt the current from said second source of direct voltage.

3. A testing device for a crystal rectifier, comprising a source of direct potential having a point of a first potential level and a point of a second potential level, a potentiometer with its fixed terminals connected between said point of a first potential level and said point of a second potential level, a means for inserting said crystal rectifier in series connection with a variable tap on said potentiometer, a direct current measuring device, a first resistance, and said point of a first potential level, a second resistance element connected in series with said first resistance device and a circuit interrupting device so as to form a circuit from said point of first potential level to said point of second potential level.

4. The device of claim 3 having third and fourth resistances arranged in bridge fashion from the said fixed terminals of said potentiometer to said variable tap.

5. The device of claim 3 having a fixed resistor inserted between said variable tap and the junction of a third and a fourth resistances whose other ends join the fixed ends of said potentiometer in bridge fashion.

6. The device of claim 2 having a jack connected in parallel with said crystal holder.

7. The device of claim 2 wherein said second source of direct voltage is derived from said first source of direct voltage.

PETER D. STRUM.

REFERENCES CITED

The following references are of record in the file of this patent:

UNITED STATES PATENTS

| Number | Name | Date |
|---|---|---|
| 2,459,849 | Stateman | Jan. 25, 1949 |

OTHER REFERENCES

Article entitled "Testing Selenium Rectifier Cells" in General Electric Review for November 1944, pages 53, 54 and 55.

"Crystal Rectifiers" by Torrey and Whitmer, published by McGraw-Hill, 1948, page 20.